United States Patent Office 3,412,807
Patented Nov. 26, 1968

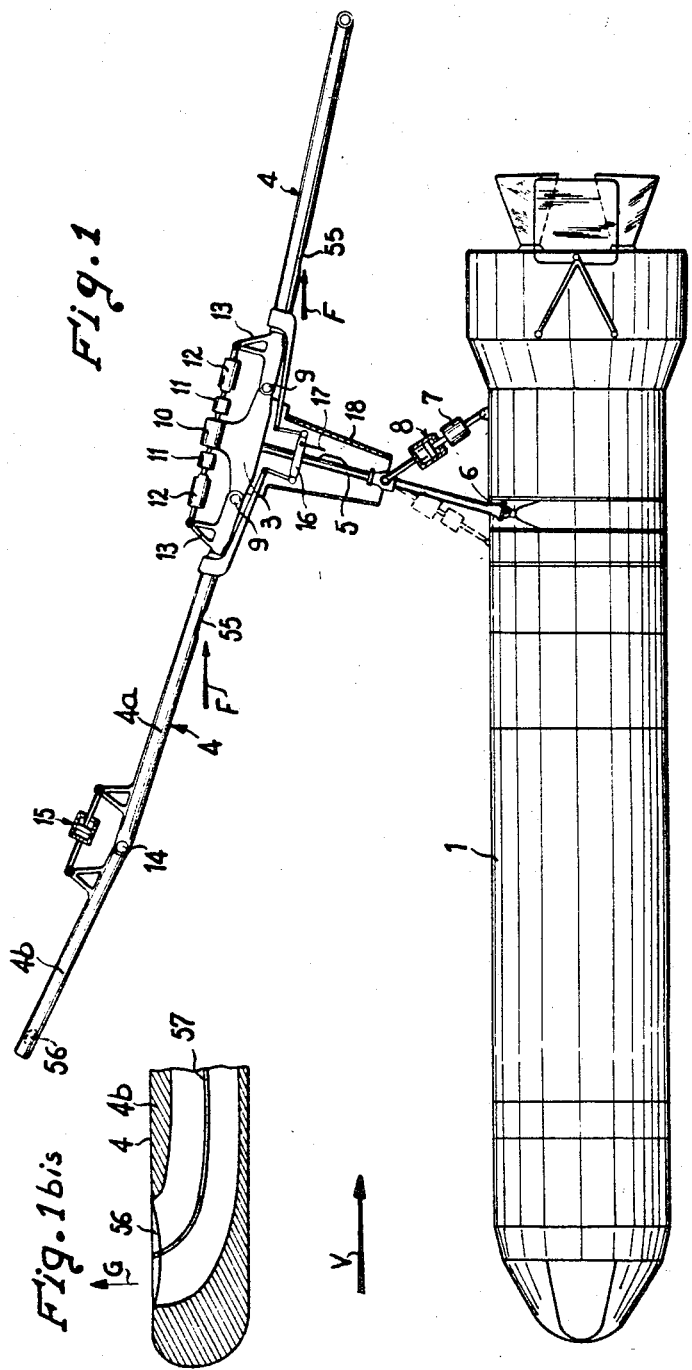

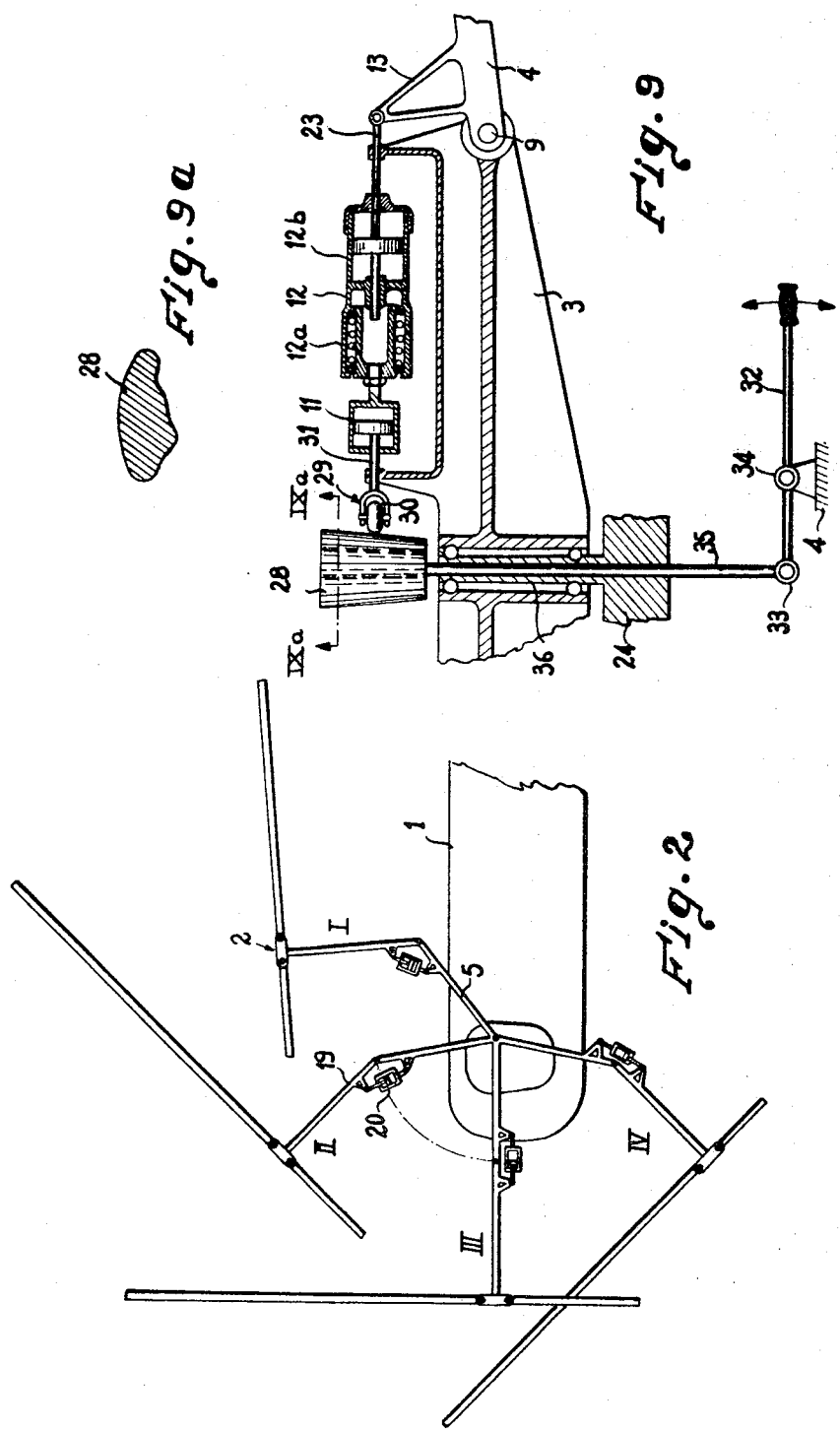

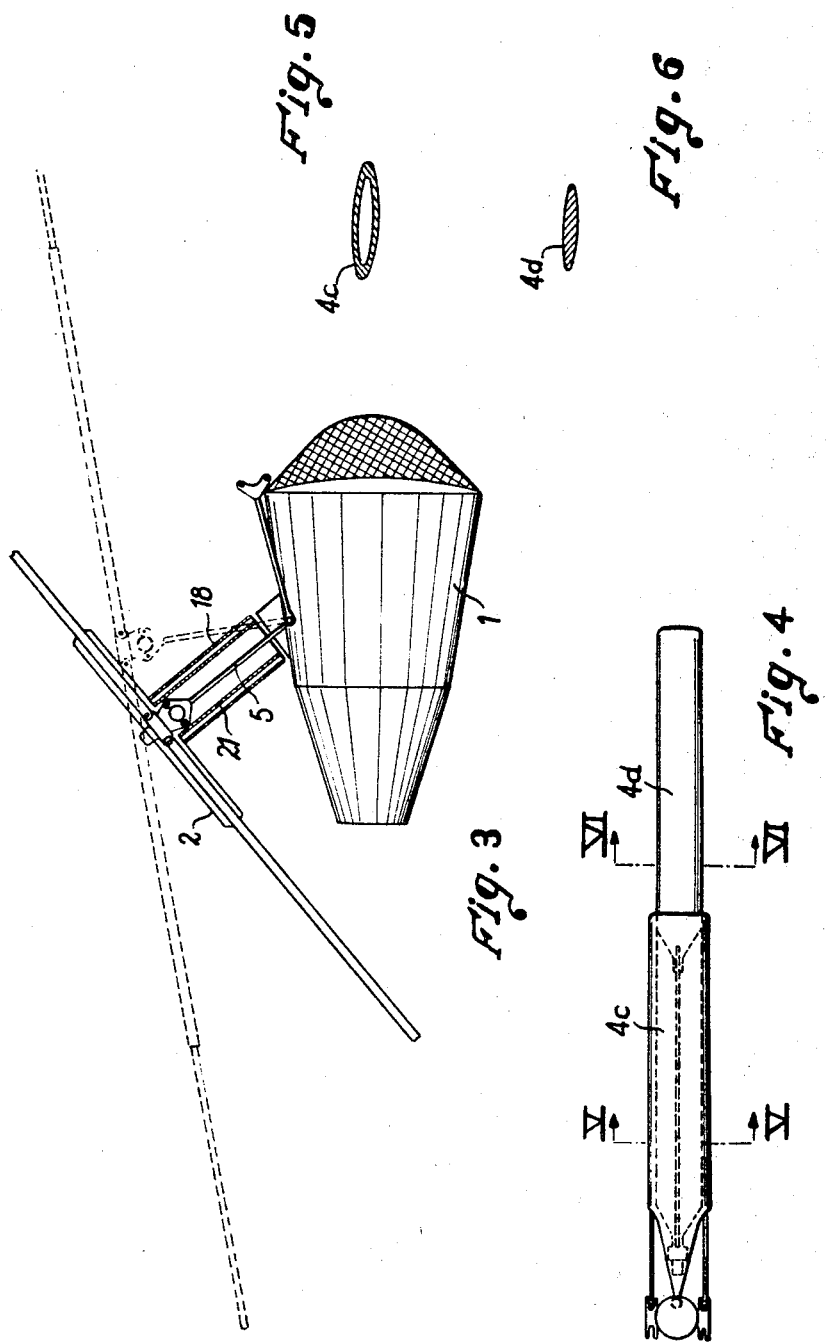

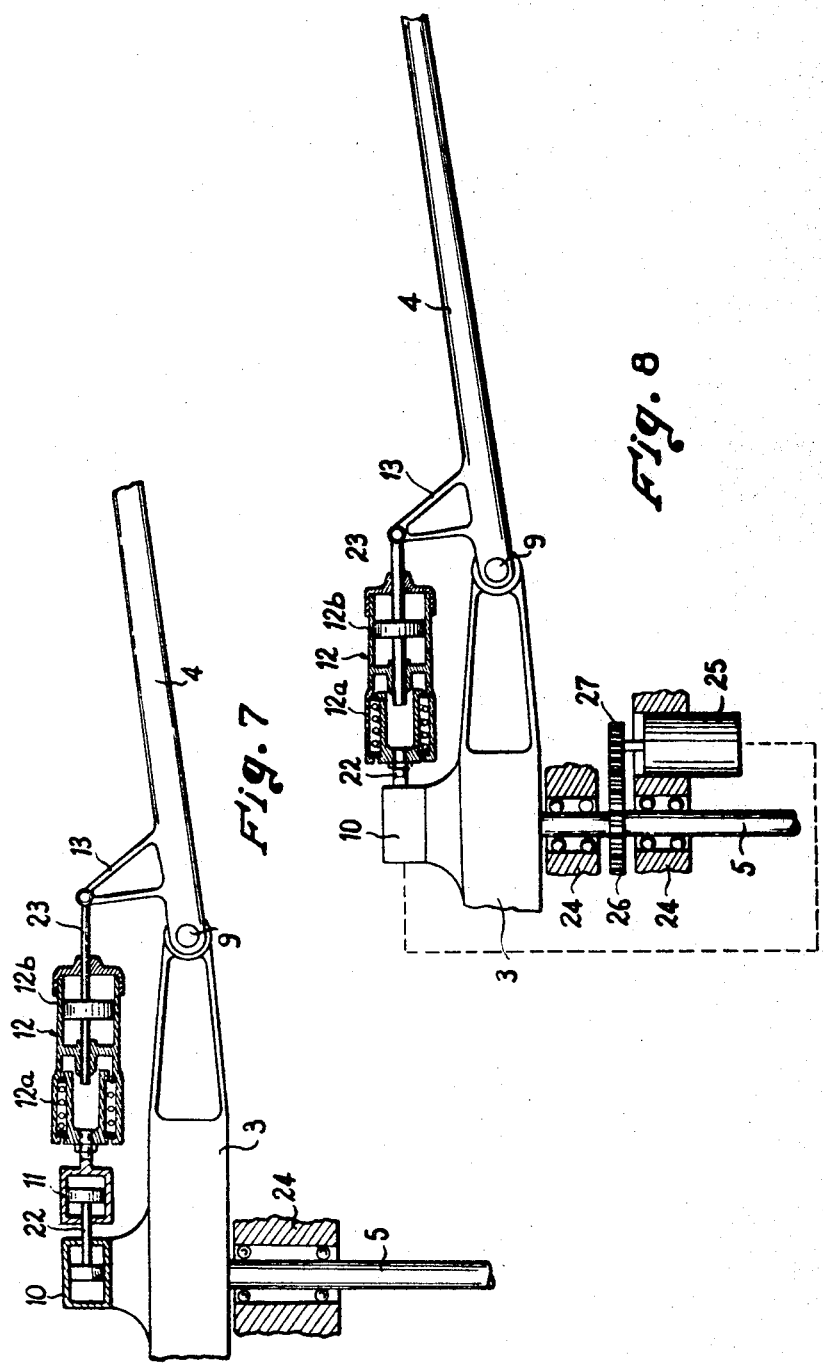

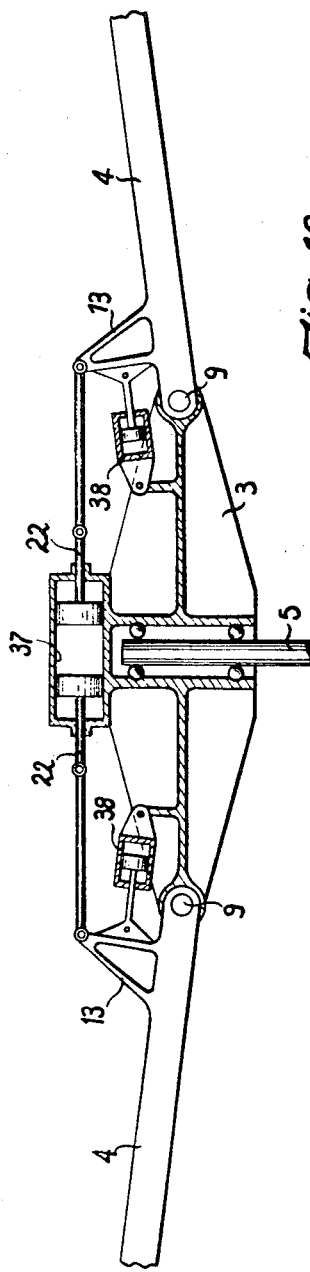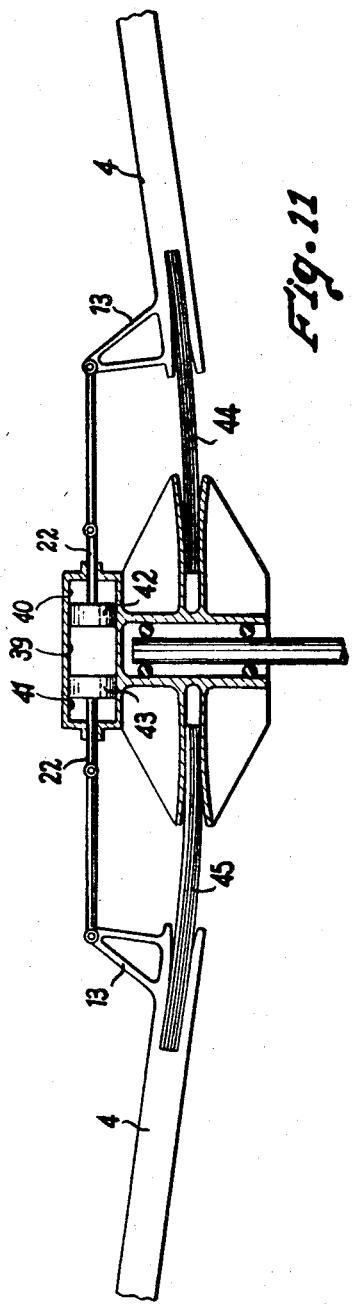

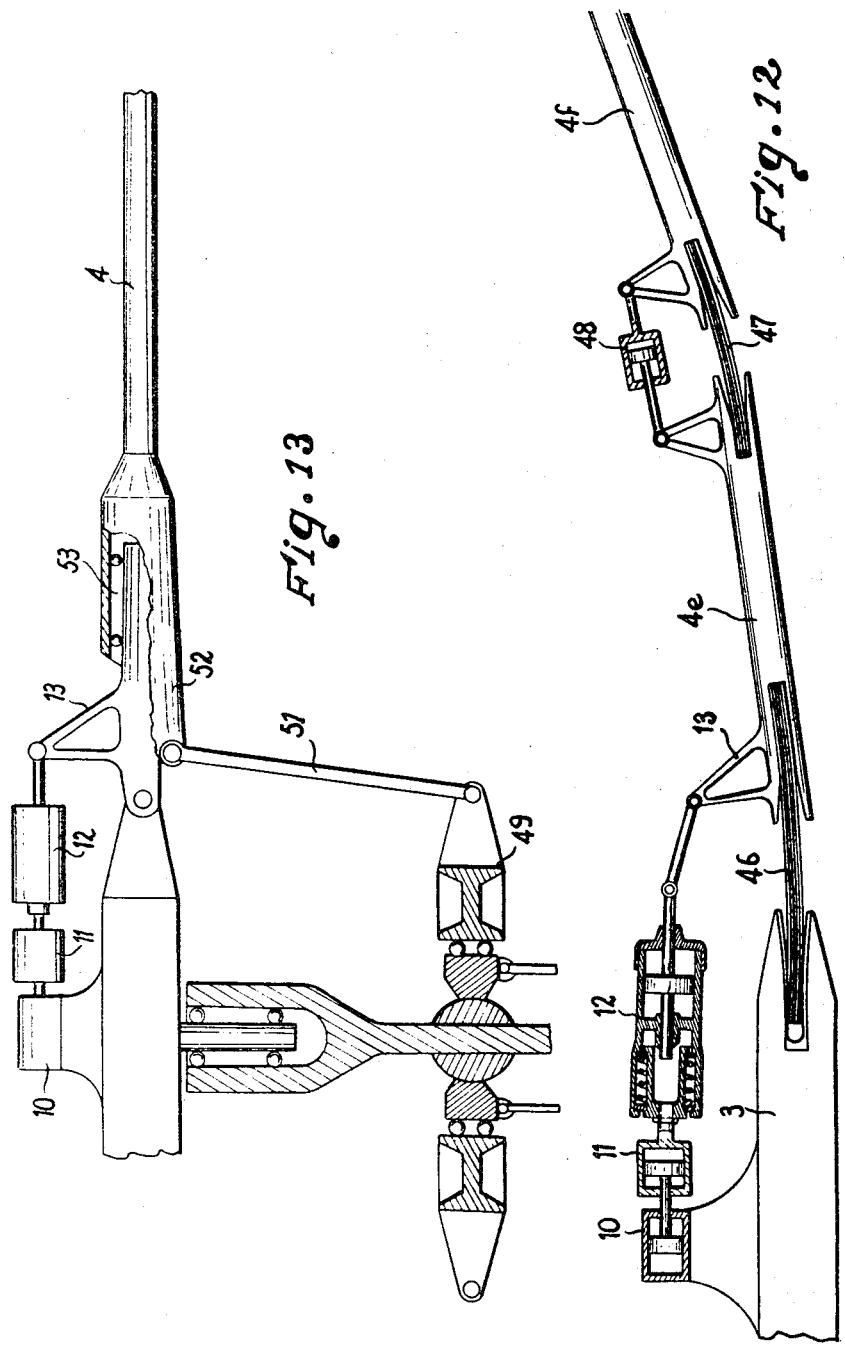

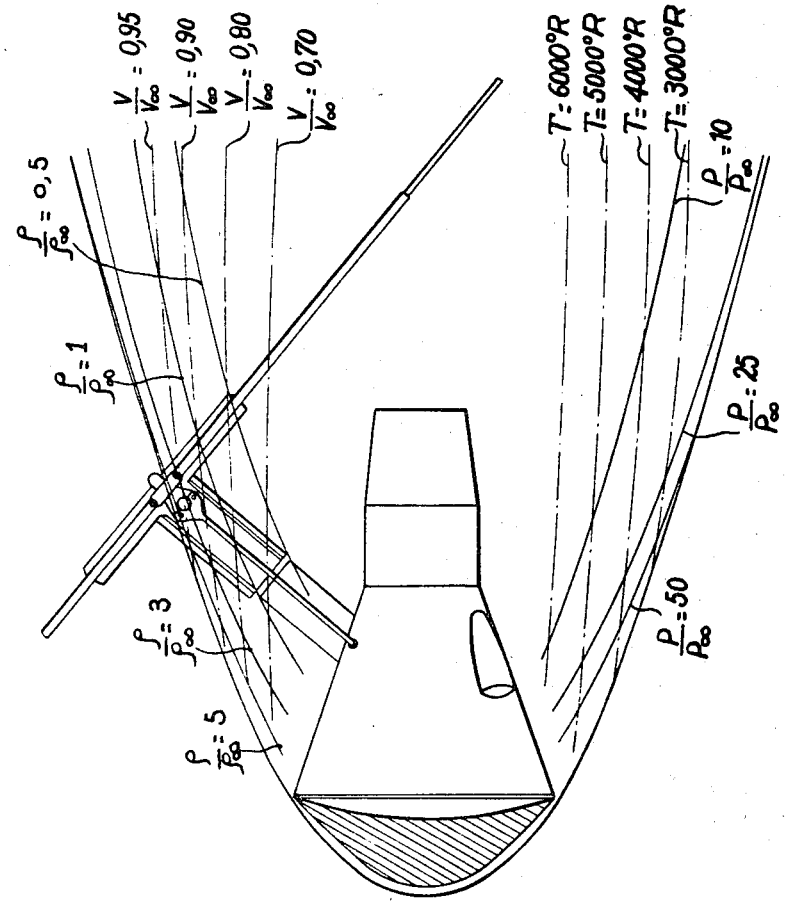

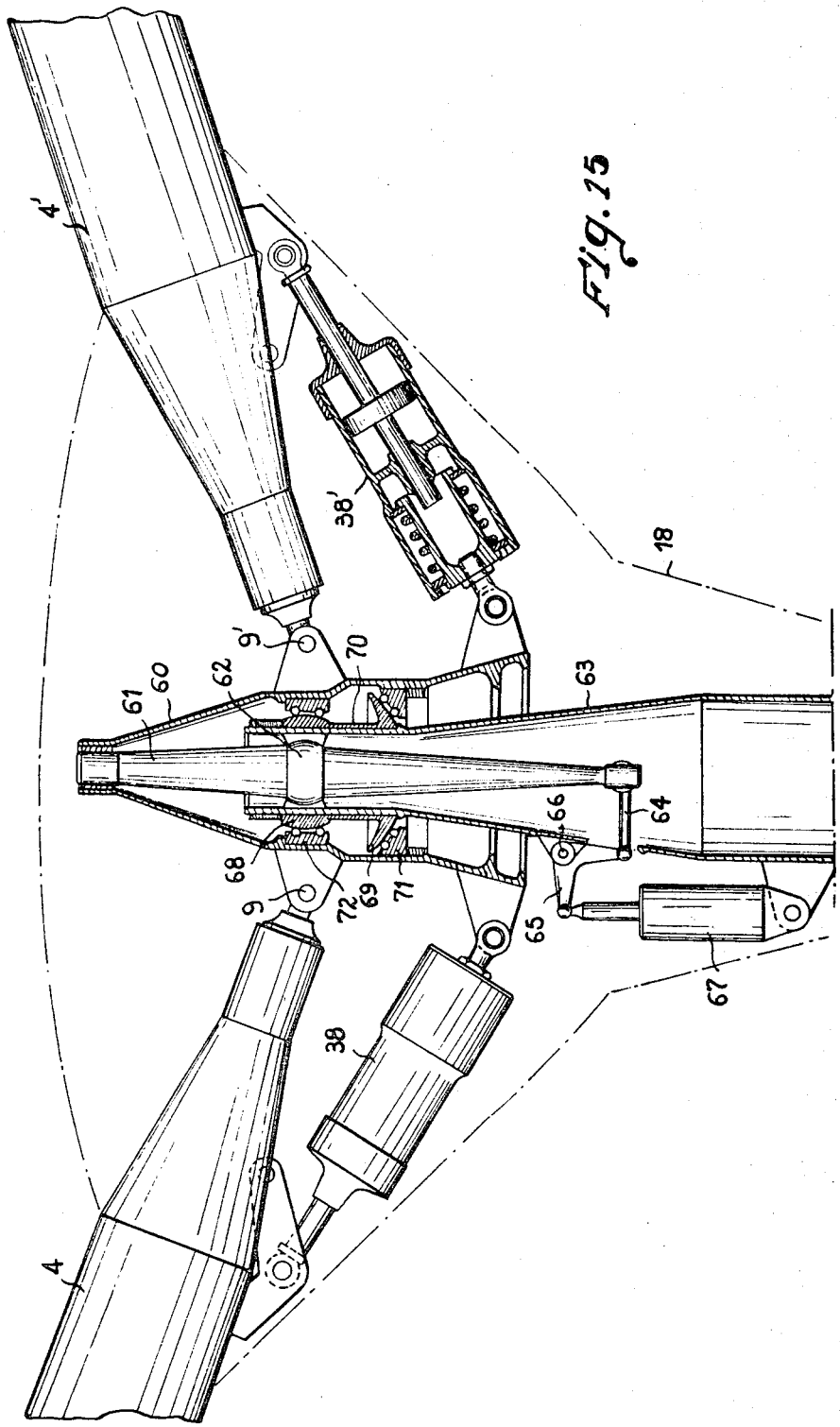

3,412,807
DEVICE FOR ENSURING THE RE-ENTRY INTO THE ATMOSPHERE AND THE RECOVERY OF SPACE VEHICLES
Marcel Kretz, Paris, France, assignor to Societe Giravions Dorand, Paris, France, a body corporate of France
Filed Dec. 13, 1965, Ser. No. 513,377
Claims priority, application France, Dec. 15, 1964, 998,633
14 Claims. (Cl. 170—160.26)

The present invention concerns a device intended to ensure the re-entry into the atmosphere of space vehicles controlled in flight, and the recovery of these vehicles on unprepared ground without the use of any sources of power. The considerable difficulties encountered until now by the technical means used to achieve re-entry for recovery of an artificial satellite arise from the fact that the conditions of re-entry and those of landing are essentially contradictory. In particular whilst for landing large surfaces are necessary to reduce speeds compatible with contact with the ground the same surfaces are, at large, superfluous at the moment of re-entry. In the case of fixed-geometry vehicles such as those which—in the phase dealt with—are hypersonic gliders, this fact gives rise to a prohibitive increase in the weight of the structure.

The difficultiy of reconciling the conditions of re-entry with those of landing is closely tied to the fierce heating to which these surfaces are subjected during the re-entry phase and which are sought to be overcome (very partially) by using blunt shapes which are essentially non-areodynamic, such as rounded leading edges or shields with high drag. In cases where manoeuverable vehicles are used such as hypersonic gliders or the vehicles carrying the structure of these latter, they have the serious disadvantage of presenting hot spots and large variations of temperature on the surfaces exposed to the ambient relative air flow.

In the present state of the art the above mentioned difficulties are overcome on the one hand by using an ablative shield which is non-reusable, to ensure the braking and protection of the vehicle during re-entry into the atmosphere, and on the other hand by using a series of parachutes for the final recovery of the vehicle. This technique known as ballistic re-entry which does not use lift, imposes on the vehicle and on its passengers or contents a very high degree of deceleration e.g. up to 10 g, and at the same time offers little or no possibility of manoeuvering the vehicle towards the desired landing area. In the final phase of the flight the drift of the parachutes in most cases means that only the sea can be used as a landing area. This requires for recovery, if time of recovery is to be minimized, the presence of a large fleet dispersed over a large area. Of necessity recoveries of this kind can only be carried out in favourable atmospheric conditions. Lastly the use of ablative protection renders the vehicle partially non-reusable.

It has also been proposed to equip aero space vehicles with rotating wings whose general plane of rotation, or more exactly the plane containing the tips of the blades, is perpendicular to the axis of the vehicles and of which the rotor system is thus subjected only to axial thrust. From the point of view of heating this arrangement presents the same disadvantages as the above mentioned fixed geometry arrangements and as it only produces drag without lift, it gives no means of controlling the trajectory of the vehicle in hypersonic flight.

An aim of this invention is to overcome the disadvantages mentioned above which concern present day aero space vehicles. The invention is concerned with a device which enables the trajectory of a space vehicle to be controlled during its re-entry into the atmosphere and avoid excessive heating by using rotating wing surfaces with blades attached to the vehicle in such a way that their assembly is capable of oscillating in a known manner in relation to the vehicle. The device according to the invention is characterised by the fact that it consists on the one hand of a means of controlling the position of the mean plane of rotation of the extremities of the blades and on the other hand by additional linkage between the hub and the blades which damps the flapping or movements of the blades in a direction at right angles to said mean plane of rotation at hypersonic and trans-sonic speeds in such a way as to maintain the said mean plane of rotation of the tips of the blades at a predetermined angle relative to the air flow in order to obtain lift and to distribute evenly over the whole of the blade surfaces the heat generated at stagnation point.

It is known that in a rotating wing machine in flight in a non-axial air flow and with blades which are able to oscillate in relation to their hub, the trajectory may be controlled by varying the lift and drag of the rotor by varying its inclination in relation to the direction of the air flow in which the tips of the blades are turning (known as the disc plane). The variation of the mean plane of the extremities of the blades is obtained either by altering the flapping angle of each blade in relation to the rotor hub or by altering the angle of the axis of the rotor hub in relation to the airframe of the machine or by a combination of both these operations. In sub-sonic flight the mean plane of the tips of the blades is determined solely by the aerodynamic forces which damp the flapping movement of the blades that is to say their movement perpendicular to the plane obtaining at their tips. This flapping movement is in fact produced at a frequency corresponding to the speed of rotation of the rotor and with the speed related to that of the linear peripheral rotation of the blades. This speed is higher in the case of conventional rotating wing machines such as helicopter or autogyro, than the flying speed of the machine. At supersonic speed the linear peripheral rotation speed of the plane and consequently the speed of the flapping movement is negligible as compared with the speed of the vehicle, thus the damping effect on the flapping movement of the blade is negligible or non-existent. As a result the position of the mean plane of the extremities of the oscillating blades is indeterminate and control of the trajectory of the vehicle by using the rotor blades is impossible. By introducing a supplementary linkage between the hub and the oscillating blades the present invention introduces the damping effect and provides both a means of controlling the trajectory of the vehicle in hypersonic flight and a means of reducing the heating of the blades. It is thus possible on the one hand to reduce the level of temperature on the skin of the vehicle and on the rotor and on the other hand to control the trajectory of the vehicle by varying lift and drag in such a manner as to limit the effects of heat and acceleration. It is essentially the rotation of the rotor blades in relation to the air flow at a predetermined angle which offers these adavntages.

Hot spots on the skin of the blades in spite of only momentary concentrations are avoided as the thermal flow is displaced periodically due to the rotation of the blades in a plane which is inclined in relation to the air flow, the period of displacement being considerably shorter than the time required to establish a temperature in the material used in the construction of the rotor. In addition in order to obtain good thermal protection of the rotor linkage proper, that is to say between the blades and the vehicle, it is possible to fit a cowling around the said parts outside the vehicle which rotates with the rotor. The periodic movement of the blades and the protective cowling according to the materials from which they are made, enables the thermal flow over the whole structure to be evenly distributed and to radiate this thermal flow towards the atmosphere from the maxium surface area composed by the rotor thus permitting the temperature of the exposed surfaces to be evened out. Quantitatively the fluctuations of temperature undergo a dynamic attenuation equal to one sixth (the actual value being $1/2\pi$) of the ratio between the time taken for the temperature to become established and the period of rotation of the rotor, a ratio exceeding five to one being easily achieved (for example with a molybdenum sheet 0.25 mm. thick and a rotor speed of 300 r.p.m. this ratio is 5 to 1, the attenuation of the fluctuations is thus equal to one thirtieth). In addition, by enabling the heat to be radiated on both sides of the structure which is exposed to the thermal flow, the temperature will be kept at an even lower level corresponding to half the flow in the case of a single skin and to only two thirds of the flow in the case of a double skin such as the space rotor blade chosen as an example.

During the vehicle's re-entry into the atmosphere at hypersonic speed the shock wave must be taken into account. This shock wave effect produces additional local heating of great intensity known as the torch effect which is three times as high as that produced by the undisturbed air flow. This torch effect is also reduced by the provision of the invention that (as previously mentioned) the rotor is inclined in relation to the air flow which produces a cyclic sweeping action in the area of the shock wave and an oblique effect on the surfaces of the blades and on the rotor-to-vehicle linkage cowling. The means of controlling the inclination of the blades is by cyclic action preferably at a frequency equal to the frequency of oscillation proper of the blades, in such a way as to give rise to forces which will amplify the action of the controls, and then cancel it, as the required degree of movement is obtained.

Means are provided for altering the phasing of the cyclically controlled impulses which control the inclination of the rotor in relation to its rotary movement so that the inclination of the rotor may be controlled in azimuth. In order to obtain a movement of auto rotation without the use of power the aero space vehicle rotor blades are set in such a way as to give a mean pitch which will cause them to auto-rotate by the effect of aerodynamic forces. When the rotor is deployed, a system which varies the blade pitch in relation to the speed of rotation of the blades and to their rising movement enables the speed of the rotor to be progressively increased. The speed of rotation of the blades can then be maintained at a predetermined level or within predetermined limits. It is also possible to initiate the rotation of the rotor as soon as the vehicle reaches the upper layers of the atmosphere by providing an air duct in the blade which takes air in at the root of the blade and ejects it at the tip of the blade. To this end at least some portion of the blade is hollow and this interior hollow space is connected to atmosphere by at least two openings one of which, constituting the air intake, is at the root of the blades and the other, representing the outlet, is at the extremity of the hollow portion preferably with a swivelling nozzle to direct the air jet from the blade tip in a direction contained within the plane of rotation of the blade and perpendicular to its longitudinal axis. The hollow construction of the blade enables the transmission of heat from the skin exposed to the heat on the under side to the skin on the opposite top side thus using the rotor blades skins to the maximum to radiate heat towards the outside. The hollow construction of the blade also permits a hot air flow towards the exterior by the effect of centrifugal compression. In order to obtain the air flow in the hollow blade there is an air inlet at the blade root and an outlet at its outer part. The inlet is on the underside of the blade and the ejection outlet may have a nozzle or vane or similar means of directing the air flow in the desired direction. One may for example have fixed nozzles which direct the air flow in the opposite sense of direction to the blade movement or movable nozzles which direct the air flow in the same or alternatively in that sense of direction, or in the same sense as that of the movement of the blade. Also means may be provided for controlling these nozzles in one or the other of these senses of direction, these means possibly depending on vehicle flight controls.

At the commencement of the vehicle's re-entry into the atmosphere the air flow in the blade enables this latter to be progressively heated when it is still cold. The air taken from the shock layer at the root of the blade passes throughout its radial length and heats it evenly, thus avoiding expansion differentials in the structure of the blade. The temperature will in fact differ as between the upper and the under side of the blade. As sub-sonic speeds are reached and the temperature on the blade (in the root area from where internal air flow is derived) becomes lower than the temperature of the skin, the internal air flow can be used to cool the blade. On the other hand this air flow which is more precisely the flow ejected at least in part by centrifugal pressure, can be used to increase the lifting characteristics of the blade. In this case as to the heating and/or cooling of the blade and the initiation of its rotation the sense of direction of the ejected air flow is opposite to the intended sense of direction of rotation of the blade. By reversing the sense of direction of ejection there may be obtained a braking effect on the speed of rotation of the blades: this braking being controlled by altering one or more of the characteristics of the air flow within the blades. When the air flow in the blade is used for cooling, one could also arrange for the air to be cooled before being taken into the blade.

The means of controlling the inclination of the rotor in relation to the vehicle may be constituted by a suspension system which includes the rotor and is movable in relation to the vehicle. This suspension system, which is movable in relation to the vehicle, is capable of satisfying all conditions of flight. For example in order to obtain the negative lift required in the case of re-entry of the vehicle into the atomsphere at a speed higher than the speed required to put it into orbit, the suspension system is positioned below the vehicle. The supplementary linkage between each blade and the hub is constituted by articulated hydraulic damper means on the blade and/or on the hub. The dampers may be compound dampers comprising a hydraulic damper combined with a spring the load of which is controlled by the displacement of the hydraulic damper. The components which control the displacement of the blades in relation to the hub are constituted by hydraulic jacks which may act on the blades through the dampers. The inclination of the swivelling hub is controlled by two actuators or jacks acting in planes perpendicular to each other. In one particular form the hub is mounted on the driving shaft by a universal joint and its inclination in relation to this shaft is controlled by an actuator or jack which rotates with or permits rotation of the hub on the shaft. In one form of construction the displacement of the blades in relation to the hub is effected by a cam operated manually or by a jack reacting through rollers respectively following cams, a damper being interposed between each roller and its corresponding blade. To alter the lift of the rotor according to the conditions of the flight the device comprises means of altering the surface of the blades in such a way as to reduce it during the period of flight in hypersonic conditions and to increase it during subsonic flight. For example the blades are constituted by two telescopic elements. In one form of construction the inner blade element used in hypersonic flight may present a straight elliptical profile or any symmetrical profile suitable for supersonic flight, whilst the outer blade element which is retractable may be given an aerodynamic profile which will improve the performance of the rotor during flight in subsonic conditions and for landing.

The cowling and at least the portion of the blades which are used in hypersonic flight are made of material with a high specific heat coefficient such as metal of the group comprising molybdenum, tantalum, tungsten, niobium, refractory steels and super alloys. In one form of construction the upper side and under side of each blade are respectively made in materials with different thermal and mechanical characteristics. In one example of application where the under side is in nickel base super alloy and the upper side is in refractory steel a difference of temperature of 200° C. (under side 1100° C. and upper side 900° C. for example) can perfectly well be withstood by the structure, the respective expansions of these metals being roughly the same. The super alloys expand less than refractory steels and at the same time they resist higher temperatures than the steels.

In one form of construction the blades are made of two or more spanwise sections connected together by articulated or flexible means and these sections of blade are also interconnected by means of hydraulic dampers which are articulated on at least one of these sections to damp the articulate movement of one section in relation to another. In the form of construction where the blade is in several sections in the simplest case of two sections the advantages presented reside essentially in the fact that the blade is given secondary means of oscillation and its deformation may be used to vary the forces acting on the blade in the symmetrical plane or the change of pitch which does not effect the establishment of vertical forces on the blade and conicity of the rotor and introduces a cyclic variation of the lift from each blade. This variation can be balanced by the harmonic deformation of the second section of the blade. The attached diagrammatic drawings, in elevation or section as the case may be, represent examples of several forms of construction exemplary of many possible variations. FIG. 1 is a view in elevation and partly in section of a vehicle according to the invention and FIG. 1 bis is a partial sectional view from above of one of the blades of the vehicle in FIG. 1. FIG. 2 is a view in elevation showing diagrammatically the various positions given to the rotor of the vehicle according to the invention and which depend upon the nature and speed of the flight concerned. FIGS. 3 to 6 are respectively a view in elevation of one form of construction of the vehicle in FIG. 1 in which the blades of the rotor are telescopic, and views in detail of the said blades. FIGS. 7 to 12 are views in elevation of various methods of control of the blades shown in FIG. 1. FIG. 13 is a view in elevation of another variation of the vehicle in FIG. 1 in which a speed regulator is associated with the rotor of the vehicle. FIG. 14 is a view in elevation illustrating the effects of the shock wave on the vehicle and the most suitable position for the rotor. FIG. 15 is a partial side view of yet another form of construction of the invention.

The vehicle represented in FIGS. 1 and 1 bis comprises a body 1 and a rotor 2 whose hub 3 supports blades 4 and is attached to the body by a rotating shaft 5 and an articulation to the body 1, at 6. The position of the suspension of the rotor (diagrammatically shown in this case by shaft 5) is controlled by means of two jacks (of which only one 7 is here fully represented) which act in two planes, namely the rolling and pitching planes. The action of each jack is conveyed to the suspension of the rotor 2 through a system of compound spring damper systems such as 8 which are interconnected and ensure in particular the damping of the suspension at a frequency which conforms to the requirements of stability of the whole system comprising rotor, suspension, and body. The action of the suspension is preferably related to one of the frequencies of the rotor. The position of the mean plane of the extremities of the blades 4 of the rotor 2 in relation to the relative air flow indicated by arrow V can also be altered by inclining the blades 4 in relation to the hub 3. To this end each blade 4 is articularly connected at 9 to the hub 3 and to control each blade, the vehicle comprises a control jack 10, a simple damper 11 in series with the jack, and in turn actuating a compound damper 12 attached to the blade by a support 13 which operates the blade, these elements being better seen in FIG. 7. By this latter arrangement the jack 10 permits cyclic operation of the blade as to its individual angle (which may be considered its dihedral angle) and the damper 11 brings the control back to a neutral position when there is an alteration of such angle of the blade. One part of the compound damper 12 enables the blade 4 to be given the desired or required frequency. The other part combined with damper 11 supplies the required damping of the blade.

In the construction shown in FIG. 1 each blade comprises two sections, namely an inner section 4a and an outer section 4b, interconnected by an articulation 14. A damper 15 is introduced between the said sections to damp their relative angular movement. The position of the articulation 14 is chosen to be such that the second frequency of the blade is equal or very close to the second harmonic of the speed of rotation of the rotor. In this case calculation shows that the articulation 14 must be situated at about 65% of the total span of the blade. The means of controlling the rotor assembly 2 consist of a cyclic plate 16 and a control 17 protected by a cowling 18 which is attached to and rotates with rotor 2. In this construction the sections 4a and 4b of each blade are hollow, and comprise air intake and outlet holes 55 and 56. The air intake 55 is placed close to the root of the blade on the under side of the latter and permits the introduction (in the direction of arrow F) of air into the hollow space inside the blade, the air being compressed centrifugally within this space and then ejected in the direction G through a hole 56 at the back or trailing edge of the blade near its tip. A deflector or cascade element 57 is placed within the blade to direct the air flow.

FIG. 2 shows various characteristic positions of rotor 2 relative to the body 1 of the vehicle according to the invention. In the form of construction shown the position of rotor 2 in relation to the air flow (the direction of which is shown by arrow V) may be altered by adjusting the position of the shaft 5 in relation to the body or, in an alternative construction, by acting on the angular setting of a rotor support 19 in relation to shaft 5 by means of a damper-jack assembly 20. The latter construction is that which is shown in FIG. 2. FIG. 2 shows at I the position of the rotor in subsonic flight of the vehicle, and at II its position in supersonic flight, at III its possible position during the trans-sonic phase and at IV a position which would also be possible in order to obtain a negative lift during re-entry into the atmosphere of a vehicle which has a speed higher than the speed of orbital spacial flight. The possibility of controlling the position of rotor 2 (by means of its suspension) in a wide range of movement from the positive vertical position to the negative vertical position enables the attitude of the vehicle body 1 to be maintained always in the direction of the air flow and thus reduce the effects of heating on the body of the vehicle.

In the version of the construction shown in FIGS. 3 to 6 each blade 4 comprises two telescopic elements 4c and 4d of which only one 4c is effective during supersonic flight and the other 4d is only effective during subsonic flight. As shown in FIG. 3 the section 4d extends section 4c of the blade in subsonic flight (rotor in dotted lines) and retracts within 4c during supersonic flight (rotor in full lines). In addition the hollow construction of the blade permits an air flow to be passed through it this air flow being forced outwards by the effect of centrifugal compression. The rotor 2 shown on FIG. 3 has a cylindrical form cowling 18. This cowling is fitted to the rotor and rotates with it. In addition it is preferably internally insulated so that the heat flow is reflected by radiation from the surface without penetrating inside. The rotation of the cylinder permits the thermal flow to be divided in proportion 1 to 4. The materials from which the cowling 18 is constructed are chosen in such a manner as to give the assembly a longer heat absorption period than the period of rotation of the rotor. For example the cowling can be made of a refractory metal such as molybdenum, niobium, or super alloy nickel with a thickness of .25 mm. and 600 mm. in diameter. A refractory fibre insulation 21 is preferably placed within the cowling. The insulating material of 21 may have a thickness of 10 mm. which enables the temperature of the suspension and the hub to be maintained at normal or at most tolerable level. With the effect of rotation the temperature of the cowling 18 is practically uniform which eliminates all the structural disadvantages due to the unequal expansion of the sheet metal. The variations of temperature do not exceed = or —6% when the speed of rotation is in excess of 100 r.p.m.

In the description of the versions of construction shown in FIGS. 7 to 13 the same reference numbers have been used as those which describe the components in FIGS. 1 to 6.

In the version shown in FIG. 7 there is a detail of the structure of the compound damper 12 as well as the method of linkage between the control elements and damper 10, 11 and 12. The compound damper consists of a spring 12a and a dashpot 12b and damper 11 is rigidly connected to the control rod 22 of jack 10. A connecting rod 23 links the compound damper 12 (connected itself to other elements of the control) to the support 13, one of which is rigidly attached to each blade 4. In addition the support of the shaft 5 shown diagrammatically at 24 can equally well be formed by the upper part of the suspension or by a rotor carrying a pylon fixed to the body.

In the version shown in FIG. 8 the control jack is actuated by a power source 25 driven by the shaft 5 attached to the hub 3. The power source 25 may be a dynamo, an air compressor or a hydraulic pump. In FIG. 2 the power source 25 is driven by a gear chain 26 and 27. The drive to the blade is transmitted through the compound damper 12 alone. In the version shown in FIGS. 9 and 9a the control jack is replaced by a cam 28 which actuates the blade through a roller 29 carried on a fork 30 attached to a control rod 31. The cam 28, which has a conical surface, may be moved vertically for example by a manual control. This control consists of a handle 32 articulated at 33 and pivoted at 34 which is connected to a rod 35 shown sliding in a sleeve 36 attached to the body 1 of the vehicle. The shape of the cam shown in FIG. 9a is so designed as to impart a cyclic variation to the control forces. In the case of a rotor with several blades the rollers of each blade bear upon the same cam thus ensuring correct interaction between all blades. In the version shown in FIG. 10 the single jack is replaced by a double acting hydraulic jack 37 in such a manner that the pressure in the cylinder acts upon the blades 4 through a piston rod 22. The three blades are damped by means of dampers 38 mounted between the support 13 and the hub 3.

In the version shown at FIG. 11 a double acting jack 39 serves at the same time to create the cyclic forces necessary to control the movement of the blades 4 and to damp their movements by reason of holes 42 and 43 in the pistons 40 and 41 respectively. Independently of this arrangement the articulation of the blades in this version are replaced by leaves 44 and 45 which alter the frequency proper of the blade. The effect of these leaves 44 and 45 is the same as the effect of the spring 12a in the version in FIG. 7. In the version shown in FIG. 12 the articulation of the bade as shown in FIG. 1 has been replaced by leaves 46 and 47 placed between the hub 3 and a section of the blade 4e and between the two sections of the blade 4e and 4f respectively introducing a local flexibility equivalent to an articulation whilst at the same time transmitting centrifugal force. The increased rigidity of the blade is used to correct its frequency proper. Damping of section 4f is ensured by a damper 48. Another version may consist of using the junction of the telescopic section of the blade (see FIG. 4) as a second articulation of the blade.

In the version of FIG. 13, the means of obtaining regulation of the speed of rotation of the rotor by the use of a conventional pitch change system is shown. The cyclic plate 49 with control shown at 50 operates blade 4 through a rod 51 and a lever 52. The blade is pivotted about its longitudinal axis on a bearing 53. In operation the amount of pitch is directly related to the moment of the aerodynamic forces which either drive the blade or brake its rotation. A negative pitch creates a positive moment which drives the blade 4 in rotation. As the pitch increases the driving moment diminishes finally to become negative and to brake the blade. The system of control comprises a means of detection of the speed of rotation and the chain of control (not shown) acting on the cyclic plate 49 so as to alter the collective pitch according to the difference between the speed of rotation required and the actual speed detected.

In FIG. 14 the shock wave area of the device according to the invention is shown at the moment of re-entry of the vehicle into the atmosphere. The various curves on this figure represent the rotating surfaces around the axis of the vehicle along which the rations of speed v, pressure $p$ and density $\rho$ of the air represent different values in relation to speed $v$ infinity, pressure $p$ infinity and density $\rho$ infinity outside the area of the shock wave. There are also curves showing the distribution of temperature inside the shock wave zone.

FIG. 15 shows another form of construction with an inclinable hub. As can be seen in this figure the blades 4, 4(1) are articulated at 9 and 9(1) on a bell-shaped hollow hub 60, compound dampers 38 and 38(1) being fitted as in the case of FIG. 10 between blades 4 and 4(1) and the hub 60. The whole assembly is protected by a cowling 18 represented by a broken line and which is rigidly attached to the blades and hub and rotates with them. The upper extremity of the bell-shaped hub 60 rests on an internal shaft 61 held in a ball joint 62 inside the hollow driving shaft 63. The shaft 61 may be inclined in relation to this latter shaft. The lower extremity of the shaft 61 is attached by a control rod 64 and a lever 65, which is articulated at 66 on the hollow shaft 63, to a jack 67 which is attached to this shaft and thus controls the inclination of the hub 60 which carries the rotor. The hub 60 itself rests upon the hollow shaft 63 by means of two concentric spherical surfaces 68 and 69. These surfaces form part of a sleeve 70 fitted to the upper part of shaft 63 and bear upon ball bearings running in grooves 71 and 72 which are attached to the bell-shaped hub 60.

Instead of mounting the hollow hub 60 on the driving shaft by means of a ball joint, the bell 60 may be attached to the driving shaft 63 by means of a universal joint in such a way that the bell 60 can incline in all directions whilst at the same time being attached to, and rotating with, the driving shaft. Naturally, this arrangement can be associated with the other blade control systems described above.

Obviously, the invention is not limited to the examples here described and illustrated, it is amenable to numerous variations according to its specific applications without departing from the scope of the invention.

I claim:

1. An aerospace vehicle having a body, a hub rotatably attached to the body and a rotating wing system supported by the body and comprising a plurality of blades hingedly connected to the hub and adapted for flapping motion with respect thereto, means associated with said hub for controlling the position of the mean plane of rotation of the blade-tips relative to the body of the vehicle and individual damping means associated with each blade and with the hub respectively and operative to individually damp the flapping motion of the blades in a direction at right angles to said mean plane of rotation at hypersonic and trans-sonic speeds of flight, whereby the plane containing the tips of the blades is maintained at a selected angle relative to the direction of the air flow and whereby the heat generated at the stagnation point is evenly distributed over the whole surface of the blades.

2. An aerospace vehicle according to claim 1 comprising means for individually controlling the inclination of each blade with respect to the hub and dampng means associated with said control means to individually damp the flapping motion of the blades with respect to the hub.

3. An aerospace vehicle according to claim 1 comprising hydraulic jacks associated with the hub to individually control the inclination of each blade with respect to said hub and damping means arranged between each blade and the respective hydraulic jack to individually damp the flapping motion of the blade.

4. An aerospace vehicle according to claim 1 comprising hydraulic jacks supported by the hub and having their movable member hingedly connected to the respective blades, and damping means hingedly connected to the hub and to each blade respectively.

5. An aerospace vehicle according to claim 1 wherein the individual damping means are compound damping means each comprising a hydraulic damper in series with a spring damper.

6. An aerospace vehicle according to claim 1 wherein the means for controlling the mean plane of rotation of the blade-tips relative to the body of the vehicle comprises means for tilting the hub relative to the body of the vehicle, and wherein damping means are arranged between each blade and the hub to individually damp the flapping motion of the blades.

7. An aerospace vehicle according to claim 1 wherein the means for controlling the mean plane of rotation of the blade-tips comprises a hub rotatably and tiltably arranged with respect to the body of the vehicle and two pairs of hydraulic jacks oppositely arranged in two planes perpendicular to each other and hingedly connected to said body and to said hub respectively, said pairs of jacks controlling the inclination of the hub in said planes, whereas the means for damping the flapping motion of the blades comprises compound dampers each formed by a hydraulic damper in series with a spring damper arranged between each blade and the hub.

8. An aerospace vehicle according to claim 1 comprising a cowling arranged to rotate with the hub and to enclose said hub, said hinged connections between the blades and the hub, and the means for controlling and damping the flapping motion of the blades, said cowling constituted by an outer casing made of a refractory metallic material having large thermic inertia and an inner insulating envelope separated by an annular gap from the outer casing.

9. An aerospace vehicle according to claim 8 wherein the form and position of the cowling enclosing the hub are correlated with the form of the front end of the body of the vehicle so that the shock wave produced during the reentry of the vehicle into the atmosphere hits said cowling without interfering with the blades.

10. An aerospace vehicle according to claim 1 comprising means for cyclical control of the inclination of the blades relative to the hub at the inherent frequency of oscillation of the blades, and individual damping means arranged between said cyclic control means and each blade operative to damp the flapping motion thereof.

11. An aerospace vehicle according to claim 1, wherein means are provided to alter the phasing of the cyclic control impulses so as to alter the azimuthal inclination of the blades.

12. An aerospace vehicle according to claim 10 wherein the cyclic control of the blade comprises cam means axially displaceable along the axis of the hub and cam followers connected to the roots of the blade through the dampers respectively.

13. An aerospace vehicle according to claim 1 comprising means for varying the pitch of the blades to vary the speed of rotation thereof in such a manner that the time of revolution of the blades is lower than the time necessary for a given temperature to become established in the hub.

14. An aerospace vehicle according to claim 1 wherein the blades comprise two telescopic elements in which at least the inner telescopic elements adjacent the hub are made of a material having high thermic inertia and have a profile adapted for supersonic flight, whereas the outer telescopic elements have a profile adapted for subsonic flight.

References Cited

UNITED STATES PATENTS

| | | | |
|---|---|---|---|
| 2,408,788 | 10/1946 | Ludington et al. | 170—172 |
| 2,440,292 | 4/1948 | Pitcairn et al. | 170—160.55 X |
| 2,595,642 | 5/1952 | Daland | 170—160.55 X |
| 2,672,202 | 3/1954 | Pullin et al. | 170—160.55 |
| 2,684,213 | 7/1954 | Robert et al. | 170—160.27 X |
| 3,228,479 | 1/1966 | Nagler | 170—160.27 |
| 3,246,864 | 4/1966 | Mack et al. | 170—160.27 |

FOREIGN PATENTS

| | | |
|---|---|---|
| 610,434 | 3/1935 | Germany |
| 438,111 | 11/1935 | Great Britain |
| 606,784 | 8/1948 | Great Britain |
| 1,213,762 | 11/1959 | France |
| 487,811 | 6/1938 | Great Britain |

EVERETTE A. POWELL, JR., *Primary Examiner.*